(No Model.)
C. DOERING.
VEHICLE BRAKE LEVER.
No. 571,854. Patented Nov. 24, 1896.
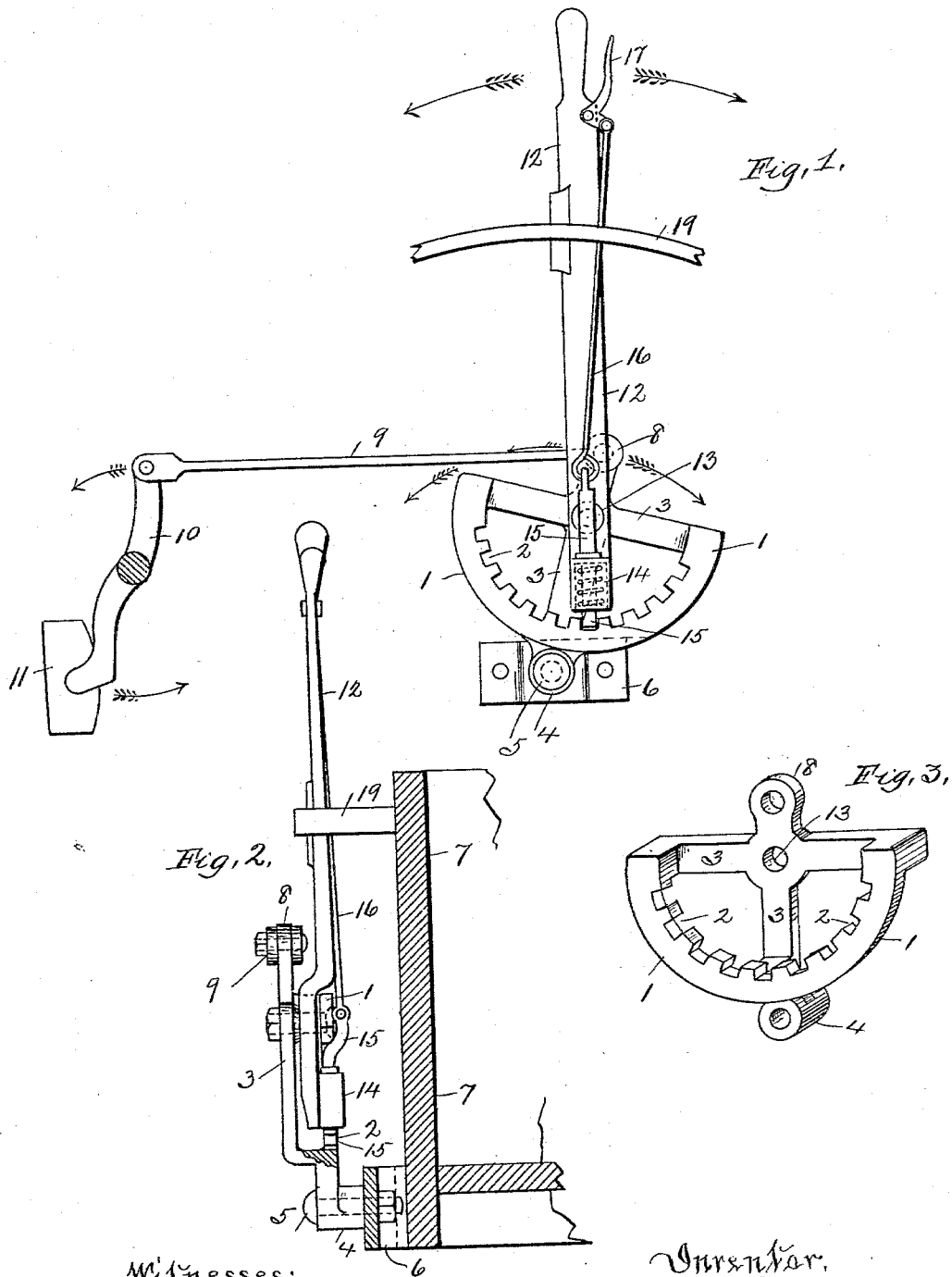

UNITED STATES PATENT OFFICE.

CHARLES DOERING, OF LIBRARY, PENNSYLVANIA.

VEHICLE BRAKE-LEVER.

SPECIFICATION forming part of Letters Patent No. 571,854, dated November 24, 1896.

Application filed November 13, 1895. Serial No. 568,771. (No model.)

*To all whom it may concern:*

Be it known that I, CHARLES DOERING, a citizen of the United States, residing at Library, in the county of Allegheny and State of Pennsylvania, have invented certain new and useful Improvements in Vehicle Brake-Levers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved vehicle brake-lever; and it consists in a device for regulating and controlling the throw of the brake-blocks, together with certain details of construction and combination of parts, as will be fully described hereinafter.

In the accompanying drawings, Figure 1 is a side elevation of my improved brake-lever, which is constructed and arranged in accordance with my invention. Fig. 2 is a front elevation of the same. Fig. 3 is a perspective view of the circular rack-bar detached from the lever.

To construct a brake-lever for vehicles in accordance with my invention, I form from metal a semicircular rack-bar 1, having the rack 2 arranged on the inner edge of the said bar and joined at the front or rear with integral bars 3, in which a bolt-opening 13 is formed and the central bar extended at the top and bottom for connection with other parts of the device. The lower extension of the rack is formed into a bearing 4, by means of which the same is pivoted with a bolt 5 to a bracket 6, firmly attached to the bed or body of the vehicle 7. The upper extension 8 is provided with an eye and connected by means of a rod 9 to the brake-lever 10, of ordinary construction. Pivoted at the center of this semicircular rack by means of a bolt 13 is a hand or brake lever 12, the lower end of which is provided with a vertically-sliding bolt or lock 15, operated by a bell-crank 17 and connecting-rod 16, together with a spring 14. This bolt or lock 15 is adapted to engage with the rack 2 and lock the two together, and thereby move the point of connection between the brake-rod 9 and upper extension 8 either to the right or left above the pivot 4 as a center and by means of an ordinary ratchet-bar 19 and clip to hold the said point at any desired position.

In operation if it is desired to move the rubber or brake block 11 some distance toward or away from the wheel the hand-lever 12 is moved either to the right or left and locked to the ratchet-bar 19. This movement of the lever 12 will change the center 8 of the rack either to place the blocks 11 in close contact with the wheels or to move the same some distance away.

It will be found that frequently when passing over muddy roads the mud will gather upon the top of the brake-blocks 11 and act as a brake to retard the vehicle, compelling the driver to dismount and remove the obstruction.

By means of a brake-lever such as above described the operator can engage the bolt 15 with the right-hand side of the rack 2 and move the lever to the left. This movement of the lever 12 will carry the blocks 11 several inches away from the wheels or to any desired distance to avoid the accumulation of the dirt upon the top of the blocks. This lever also serves as a means of adjusting the blocks 11 toward or away from the wheels when large or small by reason of being new or worn.

The lever 12 is adjusted to the desired position on the rack 2 and will enable the operator by short back and forward movements of the hand-lever 12 to either set the brake or move it remote from the wheels.

Having thus described my invention, what I claim as new, and desire to secure by Letters Patent, is—

1. In combination, a segmental rack having teeth on its inner face, a bracket to which the rack is pivoted, a lever pivoted to the frame of the rack and having a pawl engaging the teeth, a rod for operating the pawl, an extension of the rack-frame and a connecting-rod joining the brake-lever and the extension, as and for the purpose described.

2. In combination with the brake-bar of a vehicle, the semicircular rack 2, pivoted to the body of the vehicle and to the brake-rod, a hand-lever pivoted to the said rack and bolt or lock to engage the lever with the rack, as described.

3. In combination, a segmental rack, toothed on its inner surface and having a suitable frame, an extension 8, of said frame, a rod connecting the extension with the brake-lever, an operating-lever pivoted to the frame, a pawl carried by the lever and operating-rod for the pawl, and a frame on the body to which the segment is pivoted, as and for the purpose described.

4. A brake-lever consisting of the rack 2, pivoted to the bed or body of the vehicle, a lever 12, pivoted to the said rack, a means for locking and releasing the said lever to the rack and a connection 8 for attachment with the brake-rod 9, substantially as described.

In testimony whereof I affix my signature in presence of two witnesses.

CHARLES DOERING.

Witnesses:
GEO. W. LOWEN,
JOHN C. THOMPSON.